April 6, 1954 — M. WARE — 2,674,220
MULTIPLE PROPELLER DRIVE TRANSMISSION
Original Filed Oct. 4, 1947 — 4 Sheets-Sheet 1

INVENTOR.
Marsden Ware
BY
ATTORNEY.

INVENTOR.
Marsden Ware
ATTORNEY.

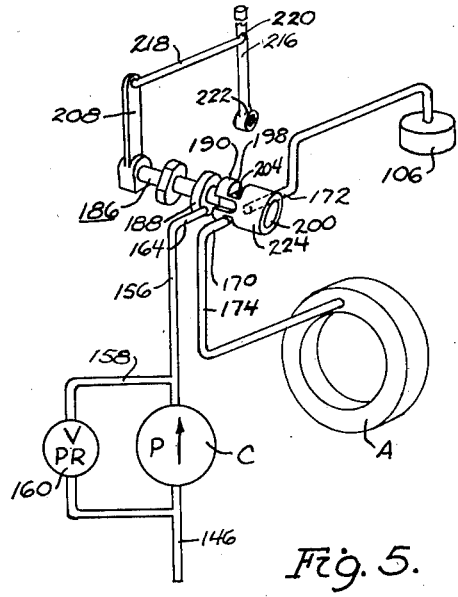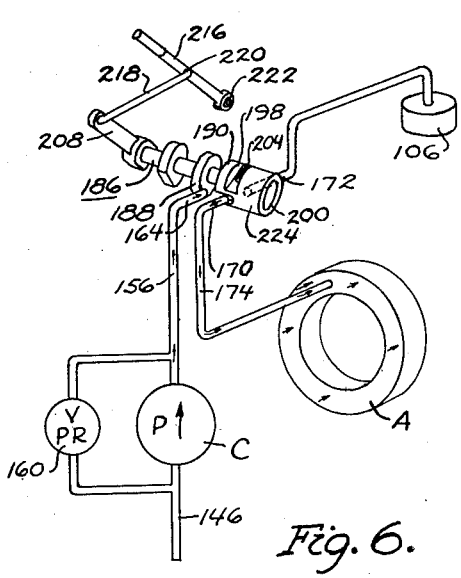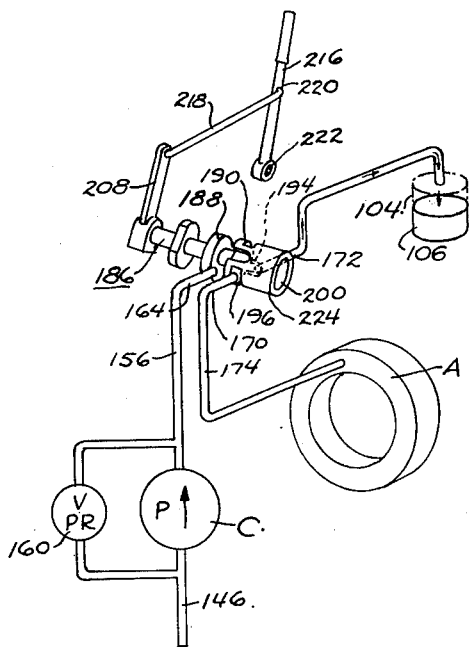

Patented Apr. 6, 1954

2,674,220

UNITED STATES PATENT OFFICE 2,674,220

MULTIPLE PROPELLER DRIVE TRANSMISSION

Marsden Ware, Huntington Woods, Mich., assignor to Packard Motor Car Company, Detroit, Mich., a corporation of Michigan Continuation of abandoned application Serial No. 777,951, October 4, 1947. This application May 16, 1952, Serial No. 288,205

1 Claim. (Cl. 115—37)

This invention relates to transmissions, and more particularly to a marine transmission having a remote control lever for actuating a valve controlling fluid pressure actuated means for selectively engaging a forward drive clutch and a reverse drive brake.

In marine transmissions heretofore used it has been customary to employ a relatively long lever to mechanically engage a forward drive clutch or a reverse drive brake. Considerable effort has been required to engage the clutch or brake, and it has been impossible to conveniently locate the control at a remote point.

An object of this invention is therefore to provide a marine transmission having a finger-tip control for actuating a valve controlling fluid pressure actuated means to selectively engage a forward drive clutch or a reverse drive brake.

Another object of the invention resides in the provision of an improved marine transmission having fluid pressure actuated forward and reverse drive clutch and brake members controlled by a valve actuated by a finger-tip controlled lever positioned at any desired remotely spaced point.

A further object of the invention resides in the provision of a marine transmission having fluid pressure actuated forward and reverse drive gearing controlled by a selector valve actuated from any desired remotely spaced point in the boat.

Yet another object of the invention is to provide a simplified control for a marine transmission wherein a manually operable valve is employed to direct fluid under pressure to provide a neutral position, and to selectively engage spaced clutch and brake members to provide forward or reverse drives.

Still a further object of the invention resides in the provision of a more readily operable forward and reverse drive marine transmission than has heretofore been available.

A further object of the invention resides in the provision of a simplified marine transmission of the epicyclic gear type having fluid pressure operated clutch and brake members controlled by a manually operable selector valve to provide forward and reverse drives.

Yet a further object of the invention is to provide a marine transmission adapted to be driven in opposite direction to accommodate right or left hand rotating engines in boats having dual propeller drives by merely reversing the brake anchoring and actuating mechanism and substituting a different element in the pump mechanism.

Still another object resides in the provision of a hydraulic control having a movable valve to select neutral, forward or reverse drive, the valve being reversible in its cylinder to facilitate connection with a manually actuated control lever.

Other objects of this invention will appear in the following description and appended claim, reference being had to the accompanying drawings forming a part of this specification.

In the drawings wherein similar reference characters refer to similar parts throughout the several views:

Fig. 5 is a diagrammatic view of the control mechanism, shown in the neutral position.

Fig. 6 is a view similar to Fig. 5 showing the control mechanism in the forward drive position.

Fig. 7 is also a view similar to Fig. 5 showing the control mechanism in the reverse drive position.

This application is a continuation of my copending application, Serial No. 777,951 filed October 4, 1947, which has since become abandoned.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figures 1, 2:
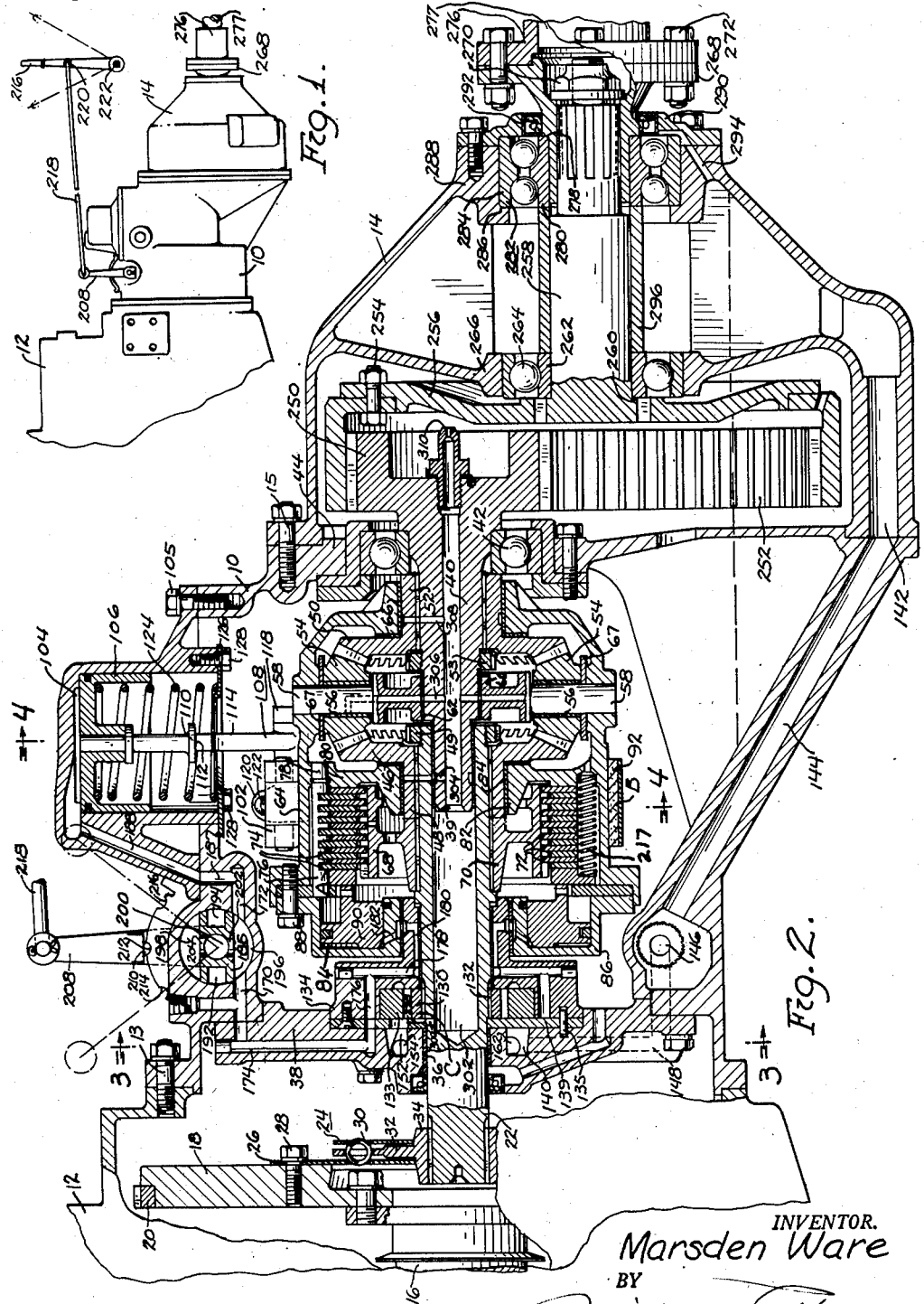
Fig. 1 is a side elevational view of a portion of a marine transmission embodying my invention.
Fig. 2 is a longitudinal sectional view of transmission illustrated in Fig. 1.

Referring now more particularly to Figs. 1 and 2 it will be noted that my improved transmission consists of a forward and reverse drive mechanism housed within a casing 10, adapted to be secured to a prime mover or engine 12 in any convenient manner as by bolts 13, and a reduction drive assembly housed within a casing 14 adapted to be secured to the casing 10 as by studs 15.

The prime mover or engine 12 may be of any suitable type, and has a power shaft or crankshaft 16 provided with the usual flywheel 18 having a starter gear 20 secured thereto. The power shaft 16 is yieldingly connected to a driving shaft 22 through a flexible connector 24. A disk 26 of the connector 24 is secured to the flywheel 18 as by studs 28 and is drivingly connected, through a plurality of circumferentially spaced springs 30, to a flange 32 of a hub 34 splined to the end of the driving shaft 22.

The driving shaft 22 rearwardly of the hub 34 is journalled in a bearing 36 mounted in a forward wall 38 of the casing 10. The rear end of the driving shaft 22 is hollow, and is provided with a bearing 39 to receive the forward end of a driven shaft 40, having its rear end journalled in a bearing 42 mounted in a rear wall 44 of the casing 12.

An epicyclic gear train is interposed between the driving shaft 22 and the driven shaft 40. A driving gear 46 of the gear train is provided with a hub 48 splined to the rear end of the driving shaft 22 and is secured in place thereon by a nut 49. A driven gear 50 having a hub 52 is splined to the forward end of the driven shaft 40 and is secured thereto by a nut 53. A plurality of spaced pinion gears 54 are interposed between and mesh with the driving and driven gears 46 and 50 as illustrated. The pinion gears 54 are mounted through bearings 56 on spaced trunnions 58 secured to a hub 60 rotatably mounted on the forward end of the driven shaft 40 through a bearing 62. The outer ends of the trunnions 58 are secured to the carrier 64 of the epicyclic gear train. The carrier has its rear end mounted on the hub 52 of the driven gear 50 through a bearing 66, bearings 67 being interposed between the outer ends of the pinion gears 54 and the carrier 64.

Means such as a plurality of friction devices associated with the carrier 64 are employed to provide forward and reverse drives from the driving shaft 22 to the driven shaft 40.

One illustrative example of forward drive mechanism includes a clutch A interposed between the driving shaft 22 and the carrier 64 to clutch the carrier to rotate with the driving shaft 22 and driving gear 46. Power is then transmitted from the driving shaft 22 through the driving gear 46, pinions 54 and driven gear 50 to the driven shaft 40 to drive it in the same direction as the driving shaft 22.

One illustrative example of reverse drive mechanism includes a brake B to lock the carrier 64 against rotation. Power is then transmitted from the driving shaft 22 and driving gear 46 through the pinions 54 to rotate the driven gear 50 and driven shaft 40 in the reverse direction.

Referring now to the forward drive clutch A, it will be noted that a clutch driving member 68 is provided with a hub 70 splined to the driving shaft 22 forwardly of the hub 48 of the gear 46. The outer surface of the clutch driving member 68 is formed with longitudinal splines to receive clutch driving disks 72. Clutch driven disks 74 are alternately spaced with reference to the driving disks 72, and have their outer edges notched to engage spaced pins 76 having their rear ends 78 projecting into apertures formed in an inwardly extending wall 80 formed in the carrier 64. The wall 80 acts as an abutment or stop member for the clutch disks and terminates in a hub portion 82 mounted through a bearing 84 on the hub 48 of the driving gear 46 secured to the driving shaft 22. The clutch disks 72 and 74 may be urged into driving engagement with each other by fluid pressure exerted in a cylinder formed in a cover plate 86 secured to the carrier 64 as by bolts 88. Fluid under pressure introduced into the cylinder 84 is exerted against a ring type piston 90 to shift the piston rearwardly to urge the clutch disks 72 and 74 into driving engagement with each other, thereby clutching the carrier 64 to the driving shaft 22. The trunnions 58 secured in the carrier 64 and carrying the pinions 54 are thus rotated with the driving shaft 22 and driving gear 46, whereupon the driven gear 50 fixed to the driven shaft 40 will be driven in the same direction as the driving shaft 22 and at the same speed. The entire assembly, including the driving shaft 22, the carrier 64 and driven shaft 40 will rotate as a unit when power is transmitted in the forward direction. There is thus no relative movement of any of the elements constituting the forward drive mechanism, hence a quiet drive is insured under conditions whereby wearing of parts is minimized.

Figure 4:
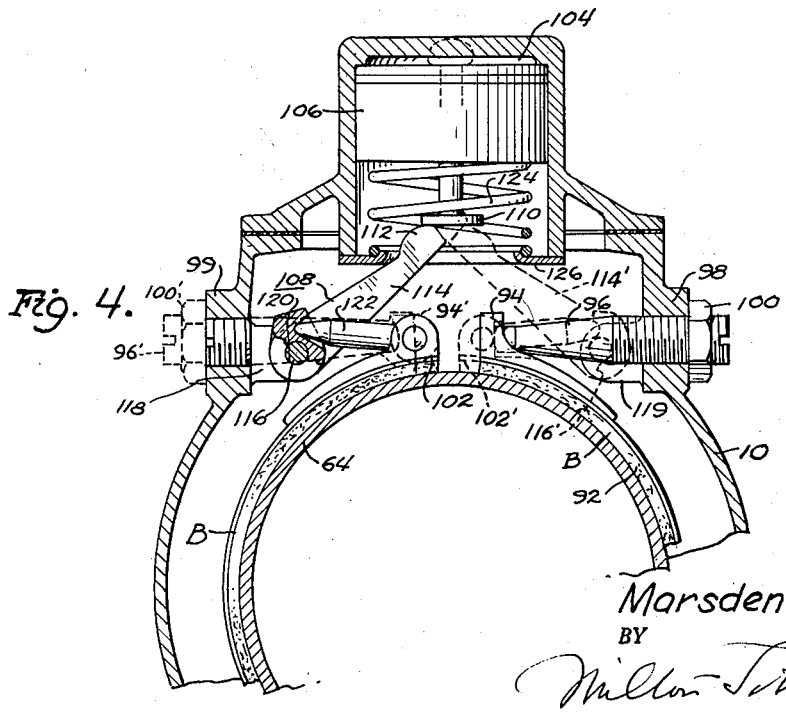
Fig. 4 is a fragmentary sectional view taken substantially on the line 4—4 of Fig. 2, looking in the direction of the arrows.

To effect the reverse drive, the forward drive clutch A is released and the reverse drive brake B is engaged to lock the carrier 64 against rotation. The brake B may be of any desired form but is shown more particularly in Figs. 2 and 4 as a band brake 92 surrounding the carrier 64, and having one end 94 adjustably secured to the casing 10 as by an anchor pin 96 threaded through a boss 98 of the casing 10, a lock nut 100 being provided to maintain the stud 96 in any adjusted position with reference to the casing 10. The other end 102 of the band 92 may be actuated in any convenient manner to engage the carrier 64, such for example as by fluid pressure introduced into a cylinder 104 secured to the casing 10 as by studs 105 to move a piston 106 downwardly in the cylinder to actuate a force multiplying linkage 108 connected to the end 102 of the band 92.

The piston 106 is provided with a stem 110 to engage a cam surface 112 of a lever 114 mounted on a shaft 116 secured in spaced bosses 118 formed in the casing 10, and having a shorter arm 120 engaging a link 122 connected to the end 102 of the band 92. A spring 124 interposed between the piston 106 and an annular abutment 126 secured to the bottom of the cylinder 104 as by studs 128 is provided to urge the piston 106 in the brake releasing direction.

When this improved transmission is to be used with engines rotating in the opposite direction, as hereinafter more fully set forth, the anchor pin is removed from the boss 98 and is inserted so as to occupy a dotted line position 96' in a threaded boss 99 positioned on the opposite side of the casing 10, the ends of the brake band 92 are reversed to assume the respective dotted line positions 94', 102' on the carrier 64, and a reversely disposed lever 114' is mounted on a shaft shown by the dotted line position 116' secured in spaced bosses 119 positioned on the opposite side of the casing 12 to engage the brake by movement of the end 102' of the band in the direction of rotation of the carrier 64.

Means driven by the driving shaft 22 are provided to supply fluid under pressure to engage the clutch and brake members A and B. One illustrative form of fluid pressure inducing means includes a pump C having an impeller 130 secured to the driving shaft 22 as by splines 132 and a rotor 133 eccentrically mounted in a pump housing 134 secured to the front wall 38 and located with reference thereto by a pin 135. The impeller has driving vanes 136 engaging vanes 138 of the rotor 133 to drive the rotor in the housing 134, a pump plate 139 being interposed between the front wall 38 and the impeller 130, rotor 133 and pump housing 134.

Figure 3:
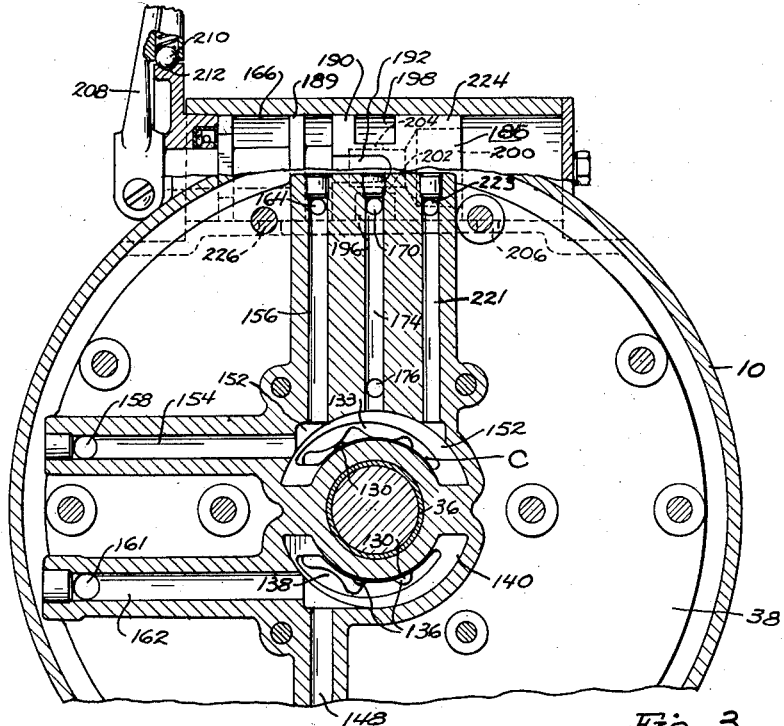
Fig. 3 is a fragmentary sectional view taken substantially on the line 3—3 of Fig. 2, looking in the direction of the arrows.

As more clearly illustrated in Figs. 2 and 3, the pump C has a suction chamber 140 which receives oil or other suitable fluid from a sump 142 through interconnected inlet passages 144, 146 and 148, and the pump delivers oil under pressure to a pressure chamber 152. Referring to Fig. 3 it will be noted that the pressure chamber 152 communicates with pressure passages 154 and 156 formed in the front wall 38 of the casing 10. The pressure passage 154 has a port 158 leading to a pressure relief or check valve 160 (see Figs. 5 to 7) preferably secured to the front wall 38, and communicating through a port 161 with a passage 162 formed in the front wall 38 and leading to the suction chamber 140 of the pump C to limit the pressure exerted in the pressure chamber 152 and passage 156 to a predetermined limit.

The pressure passage 156 communicates, through an inlet port 164, with a cylinder 166 formed in the casing 10 and having angularly spaced axially aligned outlet ports 170 and 172 spaced axially from the inlet port 164. The port 170 communicates with the cylinder 84 of the forward drive clutch A through interconnected passages 174, 176, 178, 180 and 182 in the front wall 38 and in the pump housing 134 of the pump C. The port 172 communicates with the cylinder 104 of the reverse drive brake B through interconnected passages 187 and 188.

When this transmission is to be used with engines rotating in the opposite direction as hereinafter more fully set forth, the pump housing 134 having the eccentric cylinder to receive the rotor 133 is rotated through 180° with reference to the front wall 38 and is again located by means of the pin 135 to cause the rotor 133 to rotate about an eccentric axis on the opposite side of the impeller 130. The pump plate 139 is removed and a different plate having reversely disposed elongated inlet and outlet apertures is substituted. Fluid under pressure is then pumped through the same passages as previously discussed.

Manually operable means are provided to selectively interconnect the pressure inlet port 164 with the outlet ports 170 or 172 to engage the forward drive clutch A or the reverse drive brake B, or to interrupt communication between the inlet port 164 and the outlet passages 170 and 172 to provide a neutral position. One illustrative example of manually operable control means comprises an angularly movable member 186 mounted in the cylinder 166 for oscillation in opposite directions from a neutral position illustrated in Figs. 2, 3 and 5, to forward and reverse drive positions illustrated diagrammatically in Figs. 6 and 7 respectively to direct fluid under pressure to selectively engage the forward drive clutch A or the reverse drive brake B.

The member 186 is provided with a pair of axially spaced flanges 189 and 190 positioned to straddle the pressure inlet port 164. As illustrated in Figs. 2, 3 and 5 to 7 the member 186 is provided with oppositely spaced axially extending slots 192 and 194 extending from the edge of the flange 190 to selectively interconect the forward and reverse drive ports 170 and 172 with the fluid inlet port 164 when the member 186 is oscillated in opposite directions in the cylinder 166 as illustrated diagrammatically in Figs. 6 and 7 respectively. The member 186 is also provided with transversely extending slots 196 and 198 communicating with a hollow bore 200 in the adjacent end of the member 186 through ports 202 and 204 respectively. An exhaust port 206 interconnects the end of the cylinder 166 beyond the end of the member 186 with the space within the casing 10 communicating with the sump 142.

The member 186 may be actuated in any convenient manner such as by a control lever 208 secured to one of its ends and having a spring pressed detent 210 adapted to selectively engage indentations 212, 214 and 216 to resiliently retain the member in neutral, forward and reverse drive positions respectively. Remotely spaced finger-tip control means may be provided to actuate the lever 208. One illustrative form of finger-tip control means includes a lever 216 positioned in the boat at any desired location remotely spaced from the lever 208 and connected thereto through any suitable motion transmitting mechanism such for example as a link 218 pivoted to the free end of the lever 208 and pivoted at 220 to the lever 216 at a point spaced from its pivot 222.

The control mechanism is so proportioned that the lever 208 may be positioned at either end of the cylinder 166 formed in the casing 10 to avoid interference with any object aligned with one end of the cylinder and the manually actuated control lever 216.

Referring to Fig. 3 it will be noted that the cylinder 166 is provided with an auxiliary inlet port 223 connected with an auxiliary fluid pressure supply passage 221 communicating with the pressure chamber 152 of the pump C. The auxiliary inlet port 223 is positioned on the opposite side of the outlet ports 170 and 172 and is spaced axially therefrom the same distance as the spacing of the inlet port 164 from the outlet ports 170 and 172. The outlet ports 170 and 172 communicating with the forward drive clutch A and the reverse drive brake B are positioned midway between the ends of the cylinder 166. It will thus be apparent that when the member 186 is reversed in the cylinder 166, the flanges 189 and 190 will straddle the auxiliary inlet port 222, and the axially extending slots 192 and 194 (Figure 2) will respectively overlie the outlet ports 172 and 170 when the plunger 186 is oscillated in opposite directions from the neutral position shown in Figs. 2, 3 and 5. It will be noted that the member 186 is provided with a cylindrical portion 224 positioned to overlie and close the auxiliary inlet port 223 when the plunger is in the position illustrated in Fig. 3, and to overlie and close the inlet port 164 when the member 186 is reversed in the cylinder 166. An auxiliary exhaust port 226 located in the cylinder 166 symmetrically with reference to the exhaust port 206 is provided to vent the clutch A and brake B when the member 186 is reversed, and to permit the escape of any fluid passing the flange 188 when the member is in the position illustrated in Fig. 3.

The operation is as follows: Before staring the engine 12 the finger-tip control lever 216 is moved to the neutral position with the detent 210 of the lever 208 engaging the central indentation 212. The starting mechanism is then actuated to start the engine and drive the shaft 22 having the impeller 130 of the pump C secured thereto. Operation of the engine 12 thus drives the pump C to supply fluid under pressure to the cylinder 166 of the casing 10 between the flanges 189 and 190 of the member 186. While the member 186 is in the neutral position as illustrated in Figs. 2, 3 and 5 the axially extending slots 192 and 194 of the member are out of alignment with the outlet ports 170 and 172 to prevent engagement with the forward drive clutch A or the reverse drive brake B, and fluid under pressure from the pump will be by-passed through the check valve 160. Any fluid in the cylinders 84 and 104 controlling engagement of the forward drive clutch A and the reverse drive brake B will be vented through the port 202 and bore 200 of the member 186 to the exhaust port 206 under the action of the clutch and brake release springs 217 and 124 respectively.

To engage the forward drive, the finger-tip control lever 216 is moved forwardly to shift the lever 208 to engage the detent 210 with the indentation 214, thereby oscillating the member 186 in the cylinder 166 to the position illustrated in Fig. 6 thereby aligning the slot 192 in the member 186 with the forward drive port 170 to subject the forward drive cylinder 84 to fluid pressure through the passages 174, 176, 178, 180 and 192. The piston 90 then shifts rearwardly to engage the driving and driven disks 72 and 74 thereby clutching the carrier 64 to the driving shaft 22. The epicyclic gear train then rotates as a unit with the driving and driven shafts to drive the driven shaft 40 in the same direction as the driving shaft 22.

To release the forward drive the lever 216 is returned to the neutral position illustrated in Figs. 2 and 5 whereupon the supply of fluid under pressure to the forward drive clutch A is interrupted, and the clutch release springs 217 urge the piston 90 forwardly to displace fluid from the cylinder 84 through the above enumerated exhaust passages.

To engage the reverse drive the lever 216 is shifted rearwardly to engage the detent 210 of the lever 208 with the indentation 216 and oscillate the member 186 in the cylinder 166 to the position illustrated in Fig. 7. The slot 194 in the member 186 is then aligned with the reverse drive port 172, communicating through the passages 187 and 188, to subject the cylinder 104 to fluid pressure to move the piston 106 downwardly, whereupon its stem 110 engages the cammed surface 112 of the arm 114, to rotate the shaft 116 and move the link 122 through the arm 120 to engage the band 92 with the carrier 64 to lock the carrier against rotation. The carrier is thus restrained against rotation, whereupon power is transmitted from the driving gear 46 through the pinions 54 to rotate the driven gear 50 and driven shaft 40 in the reverse direction.

It will be noted that the control mechanism functions in such a manner that it is impossible to simultaneously engage the forward drive clutch A and the reverse drive brake B because when one is engaged the other is vented. Thus there is no danger of stalling the engine or stripping the gears of the unit, and it is possible to shift rapidly from forward to reverse drive and vice versa to facilitate maneuvering a boat.

Means may be provided to effect a reduced speed ratio drive or to provide a direct drive between the engine and a propeller shaft to be driven thereby.

As illustrated in Fig. 2, the driven shaft 40 is provided with a gear 250 meshing with an internal ring gear 252 secured as by bolts 254 to a flange 256 fixed to a stub shaft 258. The forward end of the stub shaft is provided with a shoulder 260 adapted to receive the inner race 262 of a bearing 264 positioned in an inwardly extending wall 266 formed in the rear casing section 14. A coupler member 268 is splined on the rear end of the stub shaft 258 and is secured thereto as by a nut 270. The coupler member 268 is adapted to be secured in any suitable manner as by bolts 272 to a companion coupler member 276 secured to a propeller shaft 277 as illustrated in Fig. 1.

The coupler 268 is provided with a shoulder 278 to receive the inner race 280 of a double thrust bearing 282 having its outer race 284 engaging a shoulder 286 formed in a collar 288 positioned at the rear end of the casing 14. An annular cap 290 surrounding the coupler member 268 is secured to the rear end of the casing 14, a lubricant seal 292 being provided to seal the rear end of the casing, and an oil drain passage 294 extending from the space adjacent the seal 292 to the sump 142. A spacer 296 is interposed between the inner races 262 and 280 of the bearings 264 and 282 to permit clamping the inner races to rotate with the stub shaft 258 and coupler member 268 when the nut 270 is tightened.

The stub shaft 258 and the coupler member 268 are thus securely clamped against endwise movement, and the forward and reverse thrust of the propeller transmitted through the propeller shaft and coupler 276 is transferred to the casing 14 by the thrust bearing 282. The ring gear 252 is thus restrained against axial shifting whereupon proper driving engagement with the gear 250 carried by the driven shaft 40 is insured. The ratio of diameters of the gears 250 and 252 may be varied to provide suitable reduced speed drives for different requirements.

Attention is directed to the fact that in installations where a reduction drive is unnecessary the rear end of the driven shaft 40 may be splined, and the coupler member 268 may be secured directly to the driven shaft, the inner race 280 of the thrust bearing 282 abutting the hub 52 of the gear 50 to provide a direct connection between the driven shaft 40 and the coupler member 268. In installations of this type the casing which houses the conversion unit may be considerably smaller than the casing illustrated in Figs. 1 and 2 because of the elimination of the relatively large diameter ring gear of the reduction drive.

It will be apparent that suitable oil directing passages are employed throughout to provide adequate lubrication of all moving parts, oil under pressure being supplied from the pump C through a slot 298 in the pump plate 139 and radial passage 300 in the driving shaft 22 to a central passage 302 therein communicating with the various gears and bearings to be lubricated through radial passages 304, 306, 308 and 310.

Figure 8:
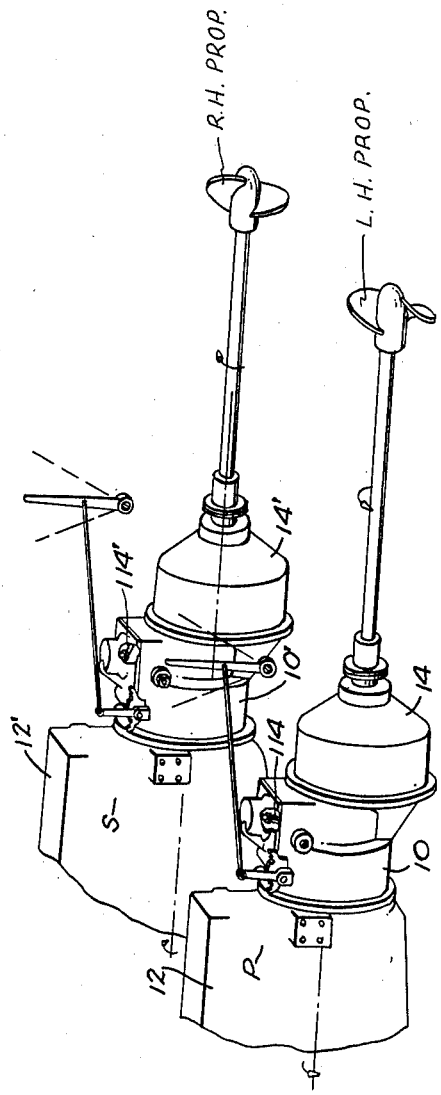
Fig. 8 is a perspective view of a marine dual propeller drive system employing this invention.

In Figure 8, two oppositely rotating port and starboard motors 12, 12' are illustrative of the respective power plants of a marine dual propeller drive system for driving a set of laterally spaced apart left and right handed propellers L. H. and R. H. A forward-reverse reduction type transmission 10 identical to the transmission of preceding Figure 2 is used to couple together the port motor 12 and the shaft for the left handed propeller L. H., and to that end includes a drum brake band, not shown, and its control lever 114 shown tilted toward a companion transmission 10' in Figure 8 and appearing in full lines in the full line showing of Figure 4. The companion transmission 10 has an oppositely tilted control lever occupying the counterpart dotted position shown by the dotted lines 114' in Figure 4 and again shown by the full line position according to the full lines 114' in Figure 8; also the drum brake band B there-adjacent is mounted by means of the reversible type mounting means therefor, such that its ends occupy the dotted line positions shown by the respective dotted lines 94' and 102', Figure 4. The transmissions have the respective reduction components 14 and 14' of Figure 8 which are identical to one another, but the transmission 10 employs the pump arrangement shown by the solid line showings of Figures 2 and 3, whereas the transmission 10' employs the reversal of this arrangement as heretofore described toward the end of the main description of the reversible pump housing 134, the locating pin 135 therefor, and the replaceable plate 139 for which ready substitution may be made in the manner taught.

It will be understood that various forms of the invention other than those described above may be used without departing from the spirit or scope of the invention.

I claim:

A marine dual propeller drive system including two motors, two reversible transmission units, and two propellers, oppositely rotating drive shafts respectively between said motors and their transmission units, a driven shaft leading from each of said units to its respective propeller, said units including identical gear trains having driving and driven gears, control means for each unit to effect forward and reverse drive and a neutral setting of each of said gear trains, said gear trains each being epicyclic and having a rotatable carrier for certain of the gears of said train, said control means including clutch and a band brake means engaging the carrier, said clutch means being adapted to lock each of the respective carriers of each unit to its drive gear to effect forward drive, said band brake means encircling and being operative to hold each respective carrier of each unit relatively stationary to effect a reverse drive, and reversible bipartite mounting means for said brake band means whereby the opposite ends of each brake means of said units may be mounted so as to be self-energizing when applied depending on the direction of rotation of the respective drive shaft of each unit, the bipartite mounting means for one end of each brake band consisting of a threadably adjustable stationary part engaging and restraining the band against rotation, and the mounting means for the opposite end consisting of a hydraulically pressure responsive and actuated part shiftable inwardly against the adjacent carrier in the direction of rotation of the same, the parts at the adjacent band ends constituting the sole supporting means for the respective band brakes.

References Cited in the file of this patent

UNITED STATES PATENTS

| Number | Name | Date |
|---|---|---|
| 1,775,856 | Hauser | Sept. 16, 1930 |
| 1,864,126 | Ferris | June 21, 1932 |
| 2,018,014 | Fahrney | Oct. 22, 1935 |
| 2,158,054 | Bradbury | May 16, 1939 |
| 2,182,386 | Patterson | Dec. 5, 1939 |
| 2,198,393 | Szekely | Apr. 23, 1940 |
| 2,279,597 | Selmer | Apr. 14, 1942 |
| 2,313,257 | Nelson | Mar. 9, 1943 |
| 2,360,987 | Temple | Oct. 24, 1944 |
| 2,409,506 | McFarland | Oct. 15, 1946 |
| 2,618,235 | Clark | Nov. 18, 1952 |

FOREIGN PATENTS

| Number | Country | Date |
|---|---|---|
| 178,092 | Switzerland | June 30, 1935 |
| 400,438 | Great Britain | Oct. 26, 1933 |